W. J. Clark.
Die for Making Bolts.

№ 44,706.  Patented Oct. 18, 1864.

Witnesses:
A. B. Stoughton
Xavier Fendrich

Inventor:
Wm. J. Clark

UNITED STATES PATENT OFFICE.

WILLIAM J. CLARK, OF SOUTHINGTON, CONNECTICUT.

IMPROVEMENT IN DIES FOR MAKING BOLTS.

Specification forming part of Letters Patent No. 41,706, dated October 18, 1864.

*To all whom it may concern:*

Be it known that I, WILLIAM J. CLARK, of Southington, in the county of Hartford and State of Connecticut, have invented certain new and useful improvements in dies for the manufacture of carriage or other bolts having a general square part underneath the head of the same; and I hereby declare that the following is a full, clear, and exact description of the same, reference being had to the accompanying drawings, making a part of this specification, in which—

Figure 1:
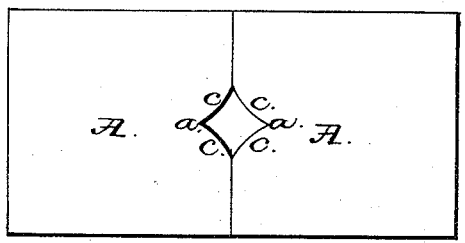
Figure 5:
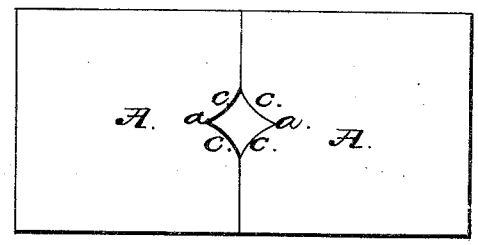
Figure 2:
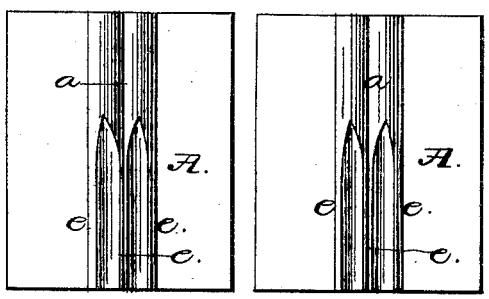
Figure 6:
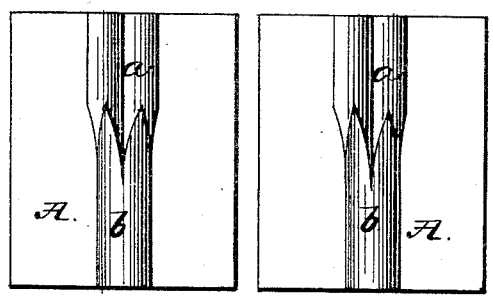
Figure 3:
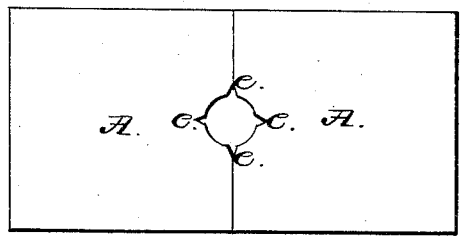
Figure 7:
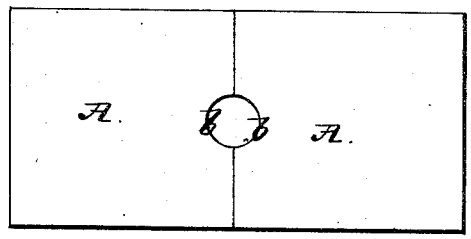
Figure 4:
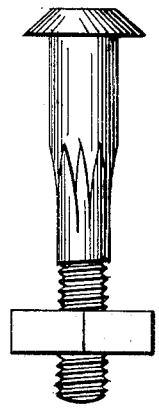

Figure 1 represents an end view of one of the dies composed of two sections, and showing the shape of the opening at that end, which is the front or anvil end. Fig. 2 represents the same two sections as spread open, and showing the shape of the semi-recesses, which, when put together, form the space in which the bolt is shaped and made. Fig. 3 represents the opposite end of the die from that shown at Fig. 1 and the form of the opening at that end, which may be called the "back end." Fig. 4 represents one of the bolts made in the die. Figs. 5 and 6 represent the same general conformity of die as that shown in Figs. 1 and 2, while Fig. 7 represents a different form of recess in the opposite end of the die from that shown in Fig. 3, it being a modification of the same general form of die.

Similar letters of reference, where they occur in the several figures, denote like parts of the die in all of the drawings.

In the manufacture heretofore of the various kinds of bolts which have a square part under the head of sufficient length and diameter to keep them from turning around in a mortise or hole that will admit the threaded portion thereof, it has been found necessary to use square iron rods and to round down the part for the thread at one operation, and then make the head by another and a distinct operation, except in certain cases where a short square portion, produced by upsetting, would answer for specific and limited uses.

My invention consists in making certain dies wherein I can use round rods or blanks, and in which the square portion of the bolt is made from a round blank, as will be hereinafter explained.

To enable others skilled in the art to make and use my invention, I will proceed to describe the same with reference to the drawings.

I take two blocks, of steel, A A, or other suitable metal, of rectangular form and equal in size, and after planing them up properly on all their faces, or such as are to have the recess made in them, I run a groove through on one or more of the faces of each, said groove being round for a portion of the length of the die, as shown at *b b*, Figs. 6 and 7, and of an angular form for the remaining length, as shown at *a a*, Figs. 5 and 6, or as long as the square is desired to be on the bolt to be made. The round part *b* is made of the proper size to fit or receive the round rod or bolt-blank that is to be used and hold it snugly, and the angular or square part *a a*, graduating from the round portion, is made convex on its sides or faces between the corners or edges *a* of the grooves, as seen at *c c*, so as to depress the metal in the center of the bolt-blank when the dies are brought together sidewise, as is designed, and thereby force the metal into the corners *a* of the same, making the square of a greater diameter across the angles of the bolt than the original diameter of the rod, and sufficiently large to hold the bolt from turning when driven into a hole or mortise that fits the round part easily. The square part of the bolt is of a greater diameter, also, from corner to corner than it is through the center from opposite faces, as will be seen from the shape of the opening of the dies at Figs. 1 and 5, by reason of the sides of the grooves being convex, while the sectional area of the square portion will be about the same as the sectional area of the round end, as shown at Figs. 3 and 7.

For the purpose of more easily constructing the grooves, I place the two blocks, sections, or dies, when ready for grooving, in a planing-machine, end to end, and having a tool with the point shaped properly to form the convex-sided square or angle, as seen at *c c*, I plane the groove entirely through the length of the two sections, of the proper size and shape to form the square portion on the bolt, as represented. I then chuck the two dies together firmly and insert and bore out with a "milling-tool" at one end, so far as is desired, a round form and of the size of the round rods that are to be used, or of the bolt-blanks, and leaving small corners *e e*, as seen in Figs. 2 and 3. The round rod is not disfigured by said corners because the round hole in the die is of just the proper size to snugly hold the rod or blank without upsetting it. In Figs. 6 and 7 this round part of the die is shown without the corners e, as the groove does not extend far enough through to form or leave them. The grooving clear through is the easier operation, but the die may be partly grooved and partly bored or milled out.

The dies thus constructed and put together in proper machinery are ready for use as follows: A heated bolt-blank is inserted or placed in the die and the two sections are brought together sidewise and clamped, and thus holding the bolt-blank by its round part and compressing it laterally, and forming the square part by driving the metal into the corners or grooved part. The faces of the sections or blocks, or "die," as it may be termed, when put together form an anvil on which the head of the bolt is made at the same operation by which the square portion of the bolt is formed, thereby saving much expense in the manufacture by reason of the use of round rods or bolt-blanks.

Having thus fully described the nature, object, and purpose of my invention, what I claim therein as new is—

The die herein described and represented for making bolts partly square and partly round out of round rods or bolt-blanks, substantially as and for the purpose described.

WM. J. CLARK.

Witnesses:
A. B. STOUGHTON,
CHAS. H. MAYER.